2,860,129
DICHLOROTRIAZINE MONOAZODYESTUFFS

Raymond Gunst, Binningen, Switzerland, assignor to Ciba Limited, Basel, Switzerland, a Swiss firm No Drawing. Application July 22, 1957
Serial No. 673,140
Claims priority, application Switzerland August 3, 1956
5 Claims. (Cl. 260—153)

The present invention provides new, valuable azo dyestuffs containing a halogenated triazine radical. These new azo dyestuffs contain an acid water-solubilising group and correspond to the general formula (1)
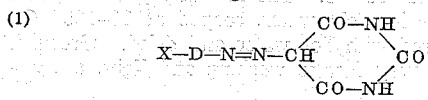

in which X indicates a 2:4-dihalogen-1:3:5-triazine radical attached by way of a group of the formula

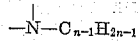

to the residue D of a diazo component, $n$ being a positive whole number, preferably 1.

As acid water-solubilizing groups are concerned in this case water-solubilizing sulfone or sulfonamide groups and advantageously ionising water-solubilizing groups such as the carboxyl and sulfonic acid groups.

Together with such a group, the dyestuffs of the Formula 1 contain a 2:4-dihalogen-1:3:5-triazine radical, preferably the dichlorotriazine radical of the formula

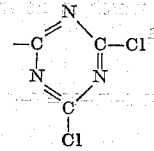

which is attached to the residue of the diazo component by way of a bridge of the formula

in which $n$ is a positive whole number which is at most 5. The

group can be attached either by way of an —$SO_2$-group or directly to the diazo component. Diazo components containing such a dihalogen triazine radical can be prepared by methods of known type from 1 mol of cyanuric chloride and 1 mol of an aromatic compound containing together with a reactive hydrogen atom attached to a nitrogen atom also a water-solubilizing group and a substituent convertible into an amino group, for example a nitro group, which substituent, after the reaction with cyanuric chloride is converted into an $NH_2$-group. On account of more easy availability, however, the diazo components of this type obtainable from 1 mol of cyanuric chloride and 1 mol of an aromatic diamine are particularly valuable. As aromatic diamines are concerned both bicyclic aromatic compounds and also, and more preferably, monocyclic diamines. Diamines containing azo groups can also be used, such as those obtained by coupling and subsequent hydrolysis of a monoacylated diamine with a compound which couples owing to the presence of a diazotisable amino group, such as naphthylamine, naphthylamine sulfonic acids, o- or m-toluidine, p-xylidine, 5-methyl - 2 - methoxy-1-aminobenzene, aminohydroquinone-dimethyl- or diethyl ether and so on. The resulting azo compounds containing two $NH_2$-groups give on reaction with 1 mol of cyanuric chloride likewise valuable diazo components useful for the manufacture of the dyestuffs concerned.

The condensation of the specified aromatic compounds with cyanuric chloride is advantageously carried out in the presence of acid-binding agents such as sodium acetate or sodium carbonate. In the condensation the operation must be so conducted that in the condensation product produced two of the three replaceable chlorine atoms remain, for example by working in weakly acid or neutral medium and/or at as low a temperature as possible.

As examples of the amines thus obtainable, of which the diazo compounds are concerned as starting materials in the present process, the following may be mentioned:

The primary condensation products of 1 mol of cyanuric chloride with 1 mol of: 4:4'-diaminodiphenyl-3-sulfonic acid, 4:(4'-aminobenzoylamino)-1-aminobenzene-2-sulfonic acid, 4-(4'-aminobenzoylamino)-2-aminobenzene-1-sulfonic acid, 4-(3'-aminobenzoylamino)-1-aminobenzene-2-carboxylic acid, 1:4-diaminobenzene-2-carboxylic acid, 1:3-diaminobenzene-4-sulfonic acid or 1:4-diaminobenzene-3-sulfonic acid, 2-methoxy - 1:4 - diaminobenzene-5-sulfonic acid and the primary condensation product of the formula

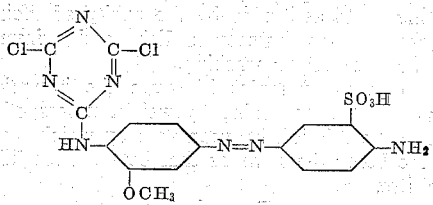

For the manufacture of the dyestuffs of the Formula 1, according to the present invention, for example, the mentioned primary condensation products are diazotized and coupled with barbituric acid.

The diazotization of the amines serving as starting materials in the present process can take place by methods of known type, for example using mineral acid, especially hydrochloric acid, and sodium nitrite. The coupling of the resulting diazo compounds with barbituric acid takes place under such conditions that the replaceable halogen atoms present in the diazo compound used do not react, i. e. advantageously in weakly acid to very weakly alkaline media and at as low a temperature as possible.

A modification of the present process consists in that the specified triazine radical is not introduced into the diazo components serving as starting materials in the present process but into the corresponding pre-formed azo dyestuffs containing in the residue of the diazo component a reactive hydrogen atom attached to a nitrogen atom and coresponding to the formula (3)
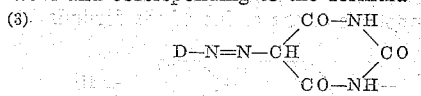

in which D indicates the residue of a diazo component containing a water-solubilizing group and, if desired, azo groups.

The dyestuffs of the Formula 3 can be prepared by methods of known type, for example from barbituric acid by coupling with diazo compounds of the monoacylated diamines likewise given for the preparation of the primary cyanuric chloride condensation products, for example the formyl derivative, and subsequent careful hydrolysis of the acyl group of the resulting monoacylamino-azo dyestuffs.

The condensation of the pre-formed dyestuffs with cyanuric trihalides is likewise so conducted that only one of the three halogen atoms is replaced.

The dichlorotriazine dyestuffs manufactured by the above process and modified process can be isolated from the reaction medium in which they are produced, for example, by salting out and filtration. They can be dried and be worked up to dry dye preparations. On account of the presence of labile halogen atoms in the molecule it is to be recommended to proceed with caution, for example to select drying temperatures that are not too high, if desired using reduced pressure and to add to the dyestuff pastes, before drying, a mixture of equal parts of mono- and dialkali phosphate.

By the above process and modified process new, valuable azo dyestuffs are obtained which contain a water-solubilizing group and correspond to the general Formula 1.

These new dyestuffs are suitable for the dyeing and printing of a wide variety of materials, especially cellulosic materials such as cellulose, linen, regenerated cellulose and cotton. They are quite particularly suitable for dyeing by the so-called cold dye process, according to which the dyeing is produced at room temperature or at moderately elevated temperature in aqueous baths containing large quantities of salts with addition of alkali. They are also suitable for dyeing by the printing or the foulard method, according to which the dyestuffs applied to the goods to be dyed by printing or on the foulard are subjected to an alkali and if desired a heat treatment and thus fixed on the material to be dyed.

The dyeings obtained with the new dyestuffs on cellulosic materials, especially on cellulosic textile materials are distinguished as a rule by the purity of their color shades, by a good fastness to light and primarily by outstanding fastness to washing.

The following examples illustrate the invention the parts and percentages being by weight unless otherwise stated and the relation between part by weight and part by volume being the same as that between the kilogram and the litre.

*Example 1*

33.6 parts of the primary condensation product from 1 mol of cyanuric chloride and 1 mol of 1:3-diaminobenzene-4-sulfonic acid are stirred in 300 parts of water, 300 parts of ice and 20 parts of 30% hydrochloric acid and diazotized at 0–2° C. with 25 parts by volume of 4N-sodium nitrite solution. The resulting diazo suspension, which is acid to Congo red, is added at room temperature to a solution, treated with 30 parts of sodium carbonate, of the sodium salt of 12.8 parts of barbituric acid in 200 parts of water. When the coupling is complete, the dyestuff is separated with sodium chloride, filtered, treated with about 5 parts of a mixture of equal parts of mono- and disodium phosphate and dried at room temperature. The resulting dyestuff dissolves in cold water with a yellow color and dyes cellulose fibers from an alkaline bath in the presence of sodium chloride at 25–35° C. in very fast, greenish yellow shades.

A more reddish yellow dyestuff is obtained by the use of diazo compounds of the amine of the formula

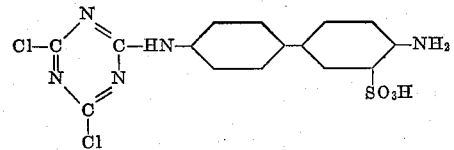

which is obtained by condensation of 4:4'-diaminodiphenyl-3'-sulfonic acid with cyanuric chloride.

Further similar dyestuffs are obtainable by diazotization of the following amines and coupling with barbituric acid:

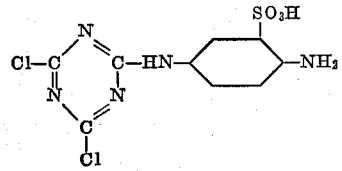

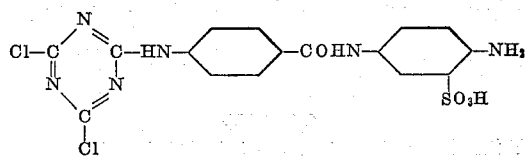

*Example 2*

2 parts of the dyestuff obtained according to the first paragraph of Example 1 are dissolved cold in 2,000 parts of water. 100 parts of well wetted cotton yarn are entered into the resulting dye bath at 20–30° C., 500 parts of a 20% sodium chloride solution added in portions in the course of 20 minutes and after a further 10 minutes 70 parts of a 8% sodium carbonate solution added. Dyeing is carried out for a further 60 minutes at 25–35° C. The resulting yellow dyeing is then rinsed with cold water, soaped at 80–100° C., thoroughly rinsed with hot water and dried. Greenish yellow shades, very fast to washing and light, are obtained.

What is claimed is:

1. An azo dyestuff which in its free acid state corresponds to the formula

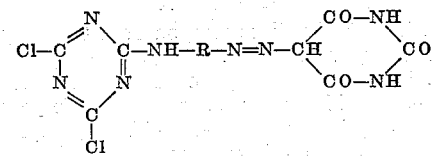

in which R represents a member selected from the group consisting of the diphenyl and benzene radicals which contain a sulfonic acid group.

2. An azo dyestuff which in its free acid state corresponds to the formula

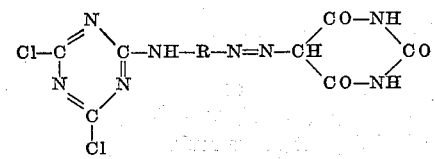

wherein R is the monocyclic radical of a benzene sulfonic acid.

3. An azo dyestuff which in its free acid state corresponds to the formula

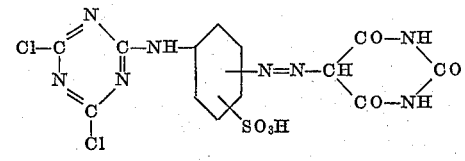

4. The mono azo dyestuff which in its free acid state corresponds to the formula

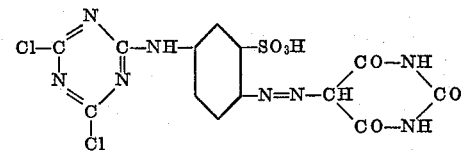

5. The mono azo dyestuff which in its free acid state corresponds to the formula

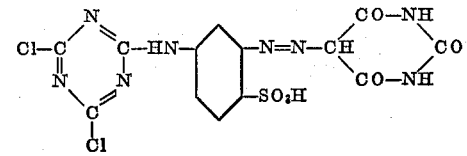

No references cited.